(12) United States Patent
Muraki et al.

(10) Patent No.: US 8,006,589 B2
(45) Date of Patent: Aug. 30, 2011

(54) ENGINE FLYWHEEL

(75) Inventors: Kazuo Muraki, Yokohama (JP); Satoru Ookuma, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 1032 days.

(21) Appl. No.: 11/807,154

(22) Filed: May 25, 2007

(65) Prior Publication Data

US 2007/0295117 A1    Dec. 27, 2007

(30) Foreign Application Priority Data

May 29, 2006 (JP) ................... 2006-148478

(51) Int. Cl.
*F16F 15/12* (2006.01)
*F16F 15/121* (2006.01)
*H02K 7/02* (2006.01)
*F16D 3/00* (2006.01)

(52) U.S. Cl. ............ 74/574.3; 74/572.1; 464/61.1; 464/64.1; 464/68.9

(58) Field of Classification Search ........... 74/570.2, 74/572.1, 573.12, 574.3, 449; 464/61.1, 464/64.1, 68.9, 68.91; 192/70.27, 89.26, 192/89.27, 70.17, 205
See application file for complete search history.

(56) References Cited

U.S. PATENT DOCUMENTS

| | | | |
|---|---|---|---|
| 2,982,150 A * | 5/1961 | Kolbe | 464/68.91 |
| 4,635,776 A | 1/1987 | Billet et al. | |
| 4,887,485 A * | 12/1989 | Kobayashi et al. | 464/68.41 |
| 5,526,714 A * | 6/1996 | Schierling | 464/68.4 |
| 6,014,912 A | 1/2000 | Carlson | |
| 6,119,548 A * | 9/2000 | Murphy | 74/570.2 |
| 6,364,775 B1 | 4/2002 | Rohs et al. | |

FOREIGN PATENT DOCUMENTS

| | | |
|---|---|---|
| DE | 19723104 | 11/1997 |
| DE | 19710918 | 9/1998 |
| EP | 0780588 | 6/1997 |
| EP | 0952374 | 10/1999 |
| FR | 2526106 | 4/1983 |
| FR | 2812703 | 8/2002 |
| GB | 2385107 | 8/2003 |
| JP | H04-287837 | 10/1992 |
| JP | 05-312053 | * 11/1993 |
| JP | 2000-304759 | 11/2000 |

(Continued)

OTHER PUBLICATIONS

Machine translation of JP 05-312053.*

(Continued)

*Primary Examiner* — Vinh T. Luong
(74) *Attorney, Agent, or Firm* — Global IP Counselors, LLP (57) ABSTRACT

In a flywheel in which narrow portions to be engaged with a coil spring included in the flywheel are formed of recessed portions made by recessing the surface of a flywheel cover, the portions of a sensor plate welded to the front cover, which confront with the recessed portions are made more fragile than adjacent portions of the sensor plate. With this configuration, when the front cover is deformed, stress applied to welded portions adjacent to the recessed portions can be suppressed since the fragile portions are easily deformed. Accordingly, even if the recessed portions are formed to the surface of a flywheel cover, stress can be prevented from being concentrated on the coupling portions of the flywheel cover and the sensor plate.

14 Claims, 6 Drawing Sheets

FOREIGN PATENT DOCUMENTS

| | | |
|---|---|---|
| JP | 2001-180297 | 7/2001 |
| JP | 2002-201978 | 7/2002 |

OTHER PUBLICATIONS

Machine translation of EP 0780588 A1, Giroire et al., Jun. 25, 1997.*
English Abstract for JP-05-312053.
English Abstract for DE-19723104.
English Abstract for FR-2812703.
English abstract for EP-0780588.
European Search Report for EP-07108937.
An English translation of the Office Action of corresponding Japanese Application No. 2006-148478, dated Jul. 20, 2010.

* cited by examiner

ENGINE FLYWHEEL

CROSS-REFERENCES TO RELATED APPLICATION

This application claims priority from Japanese Patent Application Serial No. 2006-148478 filed May 29, 2006, which is hereby incorporated by reference in its entirety.

BACKGROUND

An engine flywheel includes a sensor plate attached to a flywheel cover.

Japanese Patent Application Laid-Open No. 05-312053 discloses an engine crank angle detecting device for detecting a crank angle of an engine by attaching a sensor plate to a side surface of a flywheel and detecting concave/convex portions formed to the sensor plate using a detector disposed in confrontation with the concave/convex portions.

Incidentally, when a flywheel having a coil spring arranged therein as a damper member is used as the flywheel, it is known to have a projecting portion extending inward, which is formed by recessing the surface of a flywheel cover. An end of the coil spring is received by the projecting portion inside of the flywheel cover.

However, when the recessed portion is formed to the surface of the flywheel cover and a sensor plate is attached so as to cover the recessed portion, the sensor plate cannot be attached with the entire attachment surface thereof in intimate contact with the flywheel cover, so that the sensor plate is attached on the recessed portion in a floating state.

Accordingly, when the flywheel cover is deformed while an engine is in operation, the sensor plate cannot be deformed following to the deformation of the flywheel cover. Thus, there is a possibility that stress is concentrated to a welded portion where the sensor plate is fixed in the vicinity of the recessed portion.

SUMMARY OF THE INVENTION

An engine flywheel minimizes concentration of stress on a coupling portion (welded portion) where a flywheel cover is coupled with a sensor plate even if a recessed portion is formed to the surface of the flywheel cover.

A flywheel with a sensor plate includes at least one portion, which confronts with recessed portion formed to a flywheel cover. The at least one portion is fragile. Therefore, when the flywheel cover is deformed while an engine is in operation, the fragile portion of the sensor plate is easily deformed.

This configuration makes it possible to suppress unwanted stress applied to coupling portions (welded portion) in the vicinity of the recessed portions when the flywheel cover is deformed.

DESCRIPTION

While the claims are not limited to the illustrated embodiments, an appreciation of various aspects of the disclosed flywheel is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

Figure 1:
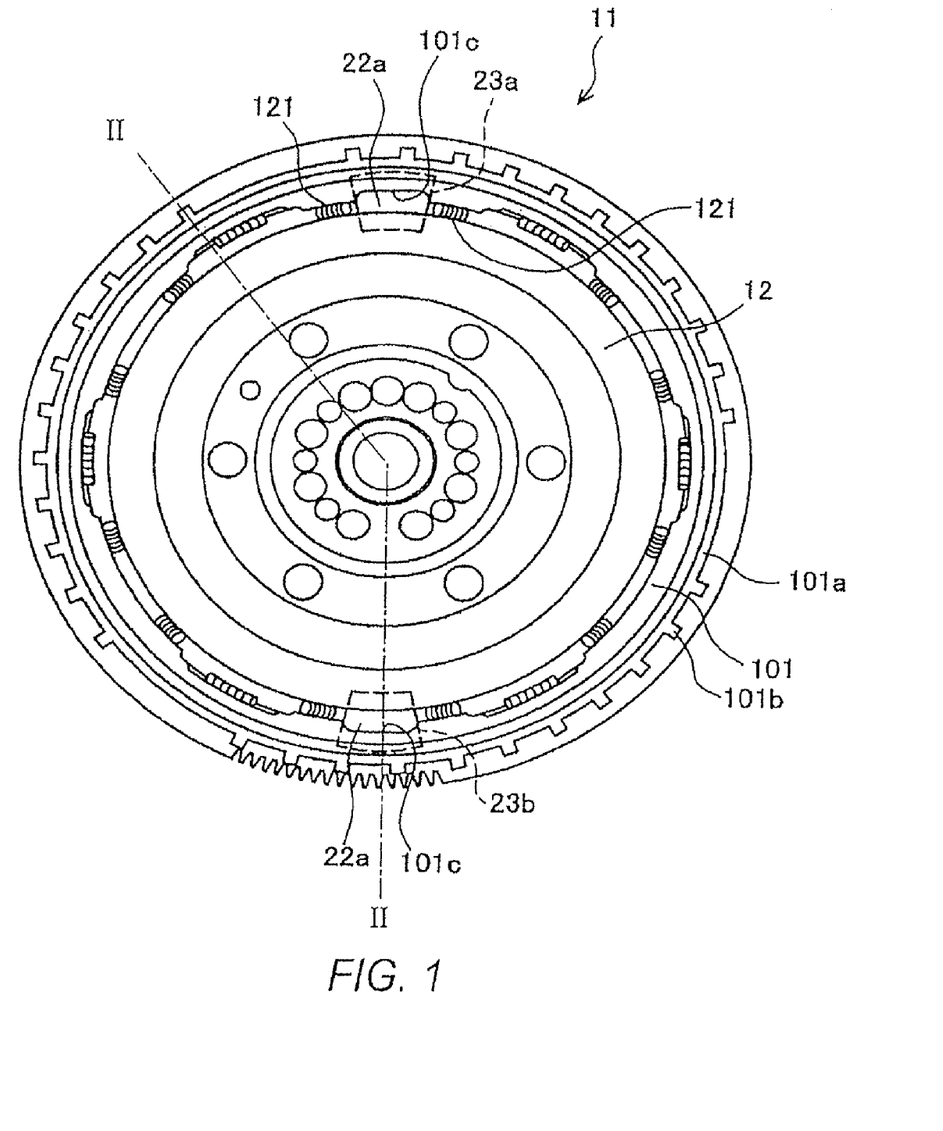
FIG. 1 is a front elevational view of a flywheel in an embodiment.
Figure 2:
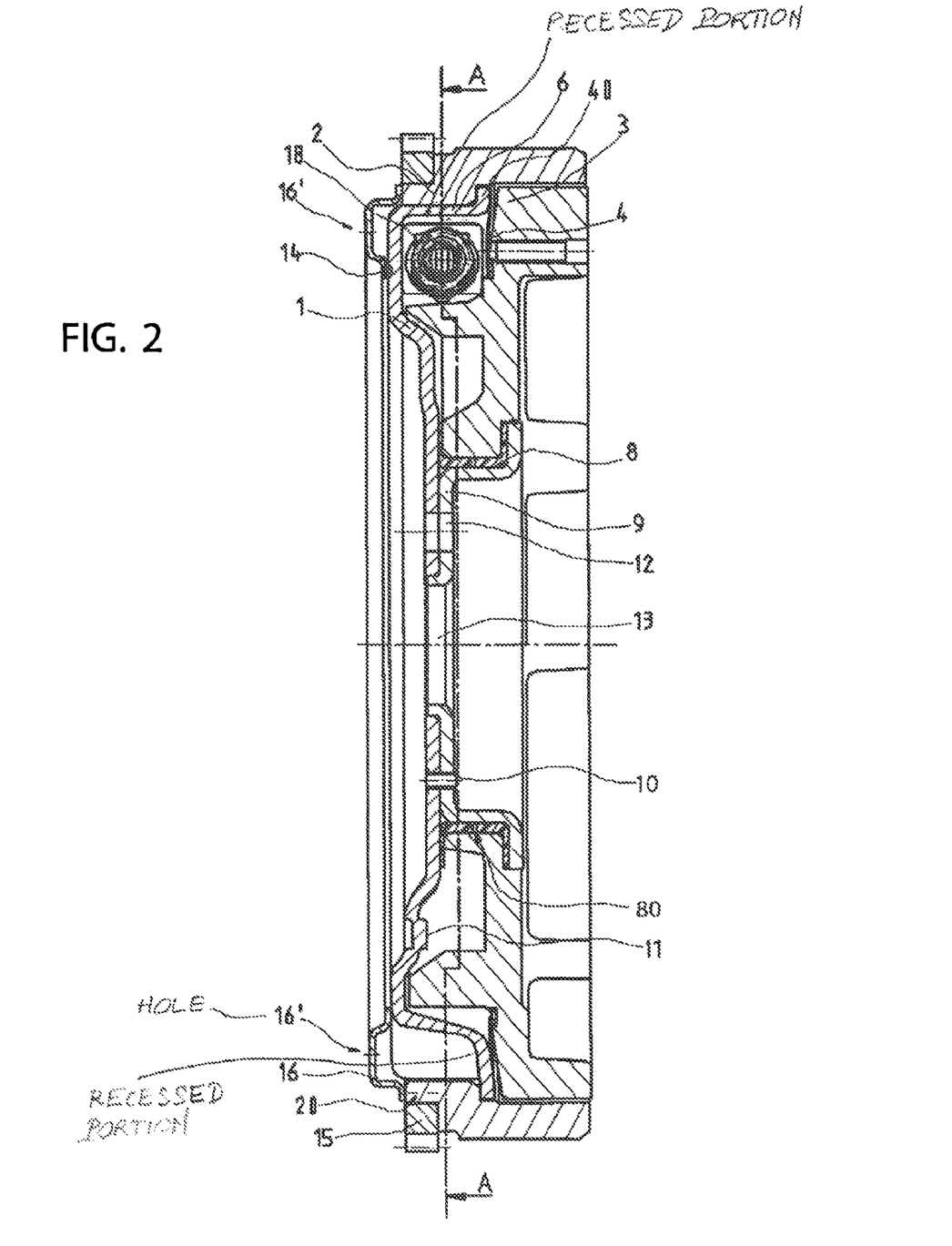
FIG. 2 is a sectional view of the flywheel shown in FIG. 1 taken along the line II-II of FIG. 1.
Figure 3:
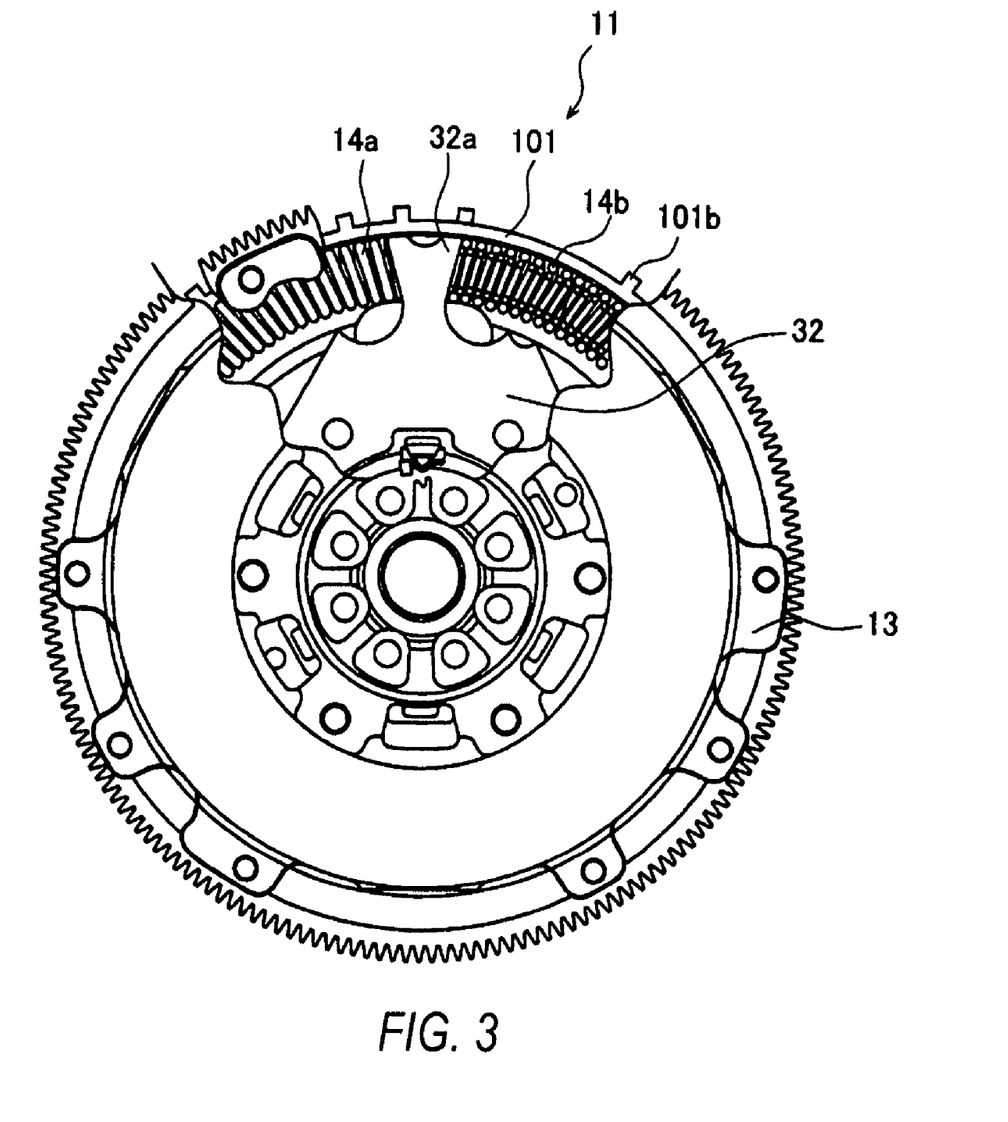
FIG. 3 is a back view of the flywheel shown in FIG. 1.

A flywheel 11 shown in FIGS. 1 to 3 is a disc-shaped member sized to have a significant moment of inertia, which is mounted on a crank shaft 30 of an engine. The flywheel 11 is composed of a front cover 12 and a rear cover 13, which constitute a flywheel cover and a coil spring unit (damper member) 14 composed of two coil springs 14a, 14b and interposed between the front cover 12 and the rear cover 13.

The front cover 12 is connected to the crank shaft 30 of the engine, the rear cover 13 is connected to an output shaft 41 through a clutch 40, and torque variation of the engine is absorbed by transmitting the rotation of the front cover 12 to the rear cover 13 through the coil spring unit 14.

The front cover 12 is composed of a flange unit 21, a front plate 22 and a coil accommodating member 24. The flange unit 21 is coupled with an end of the crank shaft 30 of the engine. The front plate 22 is fixed to the flange unit 21. The coil accommodating member 24 is coupled with the peripheral edge of the front plate 22 and forms an annular coil spring accommodating portion 23 together with the front plate 22.

The coil spring accommodating portion 23 is formed to a circular shape whose lateral cross section in the diameter direction of the flywheel is larger than the maximum diameter of the coil spring 14 and is provided with narrow portions 23a, 23b each having a reduced open area so that they are abutted against the coil spring unit 14 at two positions across the center axis of the flywheel. The coil spring accommodating portion 23 is divided into two arc-shaped accommodating portions by these two narrow portions 23a, 23b.

The two coil springs 14a, 14b are compressed between the narrow portions 23a, 23b and accommodated on right and left sides thereof, respectively.

The two narrow portions 23a, 23b of the coil spring accommodating portion 23 are formed as follows. The surface of the front plate 22 is recessed, and the bottoms 22b of recessed portions 22a are projected into the coil spring accommodating portion 23. In addition, the portions of the surface of the coil accommodating member 24 confronting the recessed portions 22a are also recessed, and the bottoms 24b of the recessed portions 24a are projected into the coil spring accommodating portion 23. Consequently, the bottoms 22b of the recessed portions 22a confront with the bottoms 24b of the recessed portions 24a at narrow intervals.

Note that gaps are formed between the bottoms 22b of the recessed portions 22a and the bottoms 24b of the recessed portions 24a to permit an inner plate 32 to be described below to pass therethrough.

The rear cover 13 has a rear cover plate 31, which is supported to the flange unit 21 through a bearing 51. The inner plate 32 is fixed to the engine side edge face of the rear cover plate 31.

A shaft (output shaft) 41 of an output side power transmission system member is coupled with the rear cover 13 through the clutch 40.

The inner plate 32 has a base portion having a diameter smaller than that of the coil accommodating member 24 and two engaging portions 32a, 32b extending from the base portion and inserted into the narrow portions 23a, 23b.

When the front cover 12 (the front plate 22) is rotated by the rotation of the engine, the rotation torque of the front cover 12 is transmitted to the inner plate 32 through the narrow portions 23a, 23b and the coil springs 14a, 14b, and the rear cover 13 is driven in rotation. However, an abrupt change of torque is absorbed in such a manner that one of the coil springs 14a, 14b is compressed and the other of them is extended.

Further, the flywheel 11 includes a sensor plate 101 that is fixed to detect a crank angle.

The sensor plate 101 is composed of a ring-shaped main body 101a having projections 101b (to-be-detected portions) projecting from the peripheral edge thereof at predetermined angular intervals. A sensor (not shown) is disposed in confrontation with a position at which the projections 101b pass, and each time the sensor detects a projection 101b, it issues a detection signal showing that the crank shaft rotates a predetermined angle.

However, the to-be-detected portions arranged to the sensor plate 101 are not limited to the projections 101b and may be a variety of openings and/or grooves.

The sensor plate 101 is fixed to the front plate 22 by being welded thereto at a plurality of positions.

The front plate 22 is provided with the recessed portions 22a as described above, and the main body 101a of the sensor plate 101 is fixed so as to cover the recessed portions 22a. The portions of the main body 101a of the sensor plate 101, which confront with the recessed portions 22a, are composed of fragile portions (e.g., first portions) 101c that are less rigid than the other portion.

Figure 4:
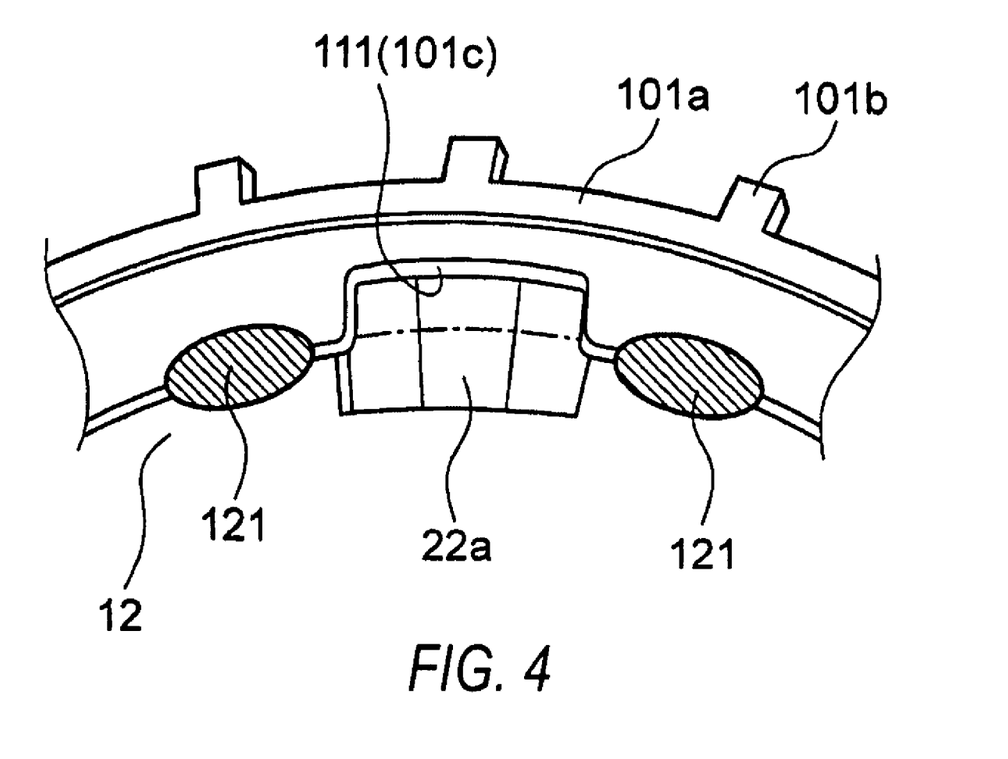
FIG. 4 is a perspective view showing a first embodiment of fragile portions.

As shown in FIGS. 1 and 4, the fragile portions 101c are formed by cutting off the portions of the inner peripheral edge of the main body 101a, which confront with the recessed portions 22a to a generally rectangular shape in conformity with the width of the recessed portions 22a in the peripheral direction thereof and reducing the rigidity thereof by partially narrowing the width of the ring-shaped main body 101a in a diameter direction by cutouts 111.

Figure 5:
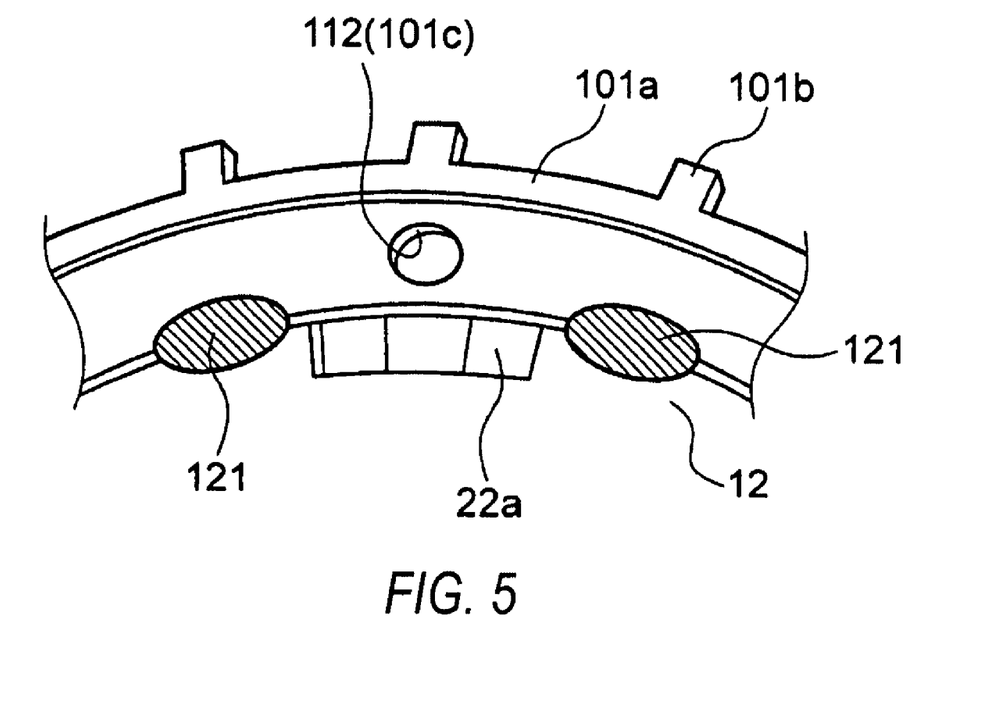
FIG. 5 is a perspective view showing a second embodiment of the fragile portions.

Further, as shown in FIG. 5, the fragile portions 101c can be formed by reducing rigidity by opening a through hole 112 to each of the portions of the main body 101a confronting with the recessed portions 22a.

Note that the fragile portions 101c can be formed by opening a plurality of through holes 112 to each of the portions of the main body 101a confronting with the recessed portions 22a.

Figure 6:
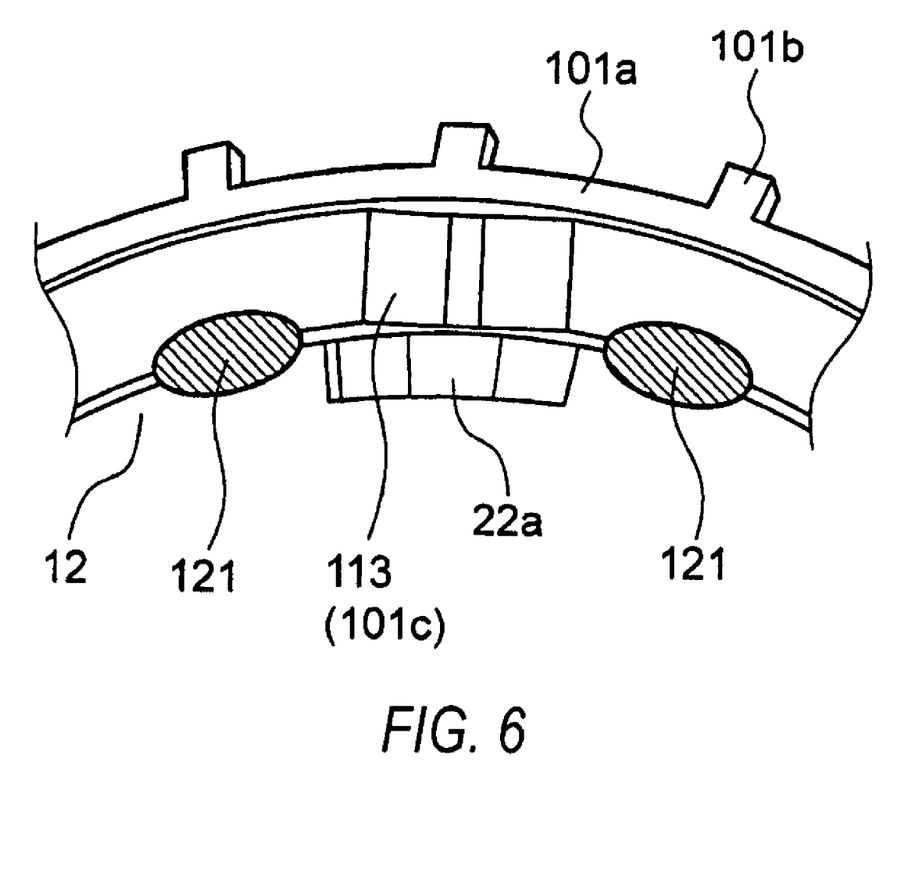
FIG. 6 is a perspective view showing a third embodiment of the fragile portions.

Further, as shown in FIG. 6, the fragile portions 101c can be formed by arranging the portions of the main body 101a confronting with the recessed portions 22a as thin wall portions 113 having a wall thickness thinner than that of the other portion.

Each of the thin wall portions 113 shown in FIG. 6 is formed to have a pair of inclining surfaces by forming the thinnest wall portions along the diameter direction of the main body 101a and gradually increasing the wall thickness of the portions 113 as they are apart from the thinnest wall portions in the peripheral direction thereof.

However, thin wall portions as the fragile portions 101c can be formed by reducing the thickness of the portions of the main body 101a confronting with the recessed portions 22a through steps.

Note that the fragile portions 101c can be formed by combining any ones of the cutouts 111, the through holes 112, and the thin wall portions 113.

Further, when the main body 101a composed of a plurality of individual parts is attached to the front plate 22, the separating portions where the individual parts are separated from each other can be caused to act as the fragile portions 101c by locating the separating portions at the positions confronting with the recessed portions 22a.

Moreover, the portions of the main body 101a confronting with the recessed portions 22a can be caused to act as the fragile portions 101c by composing the portions of a material which is less rigid than the other portion.

Although the sensor plate 101 to which the fragile portions 101c are formed as described above is welded at a plurality of positions of the inner peripheral edge thereof and coupled with the front plate 22, welded portions 121 are formed adjacent to both the sides of the fragile portions 101c in the peripheral direction thereof.

Assume that the sensor plate 101 is provided with the fragile portions 101c confronting with the recessed portions 22a. In this case, even if the front cover 12 (front plate 22) is deformed while the engine is in operation, the fragile portions 101c are easily deformed as the portion of the sensor plate 101 in intimate contact with the front plate 22 is deformed. Consequently, stress applied to the welded portions 121 (coupling portions) in the vicinity of the recessed portions 22a can be suppressed.

Accordingly, it is possible to enhance reliability of the flywheel 11 (sensor plate 101).

Note that the structure of the flywheel 11 is not limited to the structure shown in FIGS. 1 to 3, and any flywheel 11 which has recessed portions formed to the surface of a front cover 12 (front plate 22) to which a sensor plate 101 is attached can achieve the same advantage by being applied with the flywheel structure having the fragile portions according to the present invention.

What is claimed:

1. A flywheel comprising:
a flywheel cover including at least one recessed portion;
a sensor plate attached to the flywheel cover, the sensor plate including at least one first portion, with the first portion of the sensor plate axially confronting the at least one recessed portion; and
a plurality of coupling portions fixedly coupling adjacent portions of the flywheel cover to adjacent portions of the sensor plate, respectively, with the adjacent portions of the flywheel cover being disposed circumferentially adjacent to the at least one recessed portion in both circumferential directions of a center axis of the flywheel relative to the at least one recessed portion, respectively, with the adjacent portions of the sensor plate being disposed circumferentially adjacent to the first portion in both circumferential directions of the center axis of the flywheel relative to the first portion, respectively, with the coupling portions being formed at circumferentially spaced apart locations with a circumferential spacing therebetween, the at least one recessed portion and the first portion being circumferentially disposed within the circumferential spacing between the coupling portions,
the first portion having less rigidity than the adjacent portions of the sensor plate such that the first portion deforms as the adjacent portions of the sensor plate are deformed in response to deformation of the flywheel cover.

2. The flywheel according to claim 1, wherein the first portion includes less material as compared to the adjacent portions of the sensor plate.

3. The flywheel according to claim 2, wherein the flywheel cover includes a plurality of recessed portions, and the sensor plate includes a plurality of first portions, each of the first portions confronts respective one of the recessed portions.

4. The flywheel according to claim 2, wherein the sensor plate is a ring shape, and the first portion has a reduced width in a diameter direction of the sensor plate as compared to the adjacent portions of the sensor plate.

5. The flywheel according to claim 4, wherein the flywheel cover includes a front cover having the at least one recessed portion, and a rear cover coupled to the front cover with a damper member interposed between the front and rear covers.

6. The flywheel according to claim 5, wherein the damper member includes at least one coil spring with the at least one recessed portion of the front cover having a bottom projecting into a coil spring accommodating portion of the front cover that has the at least one coil spring.

7. The flywheel according to claim 4, wherein the sensor plate is attached to the flywheel cover by welded portions, the welded portions forming the coupling portions of the flywheel, respectively, the welded portions being arranged circumferentially adjacent to the first portion in the circumferential directions of the flywheel cover, respectively.

8. The flywheel according to claim 4, wherein the flywheel cover includes a plurality of recessed portions, and the sensor plate includes a plurality of first portions, each of the first portions confronts respective one of the recessed portions.

9. The flywheel according to claim 2, wherein the first portion is formed by opening a through hole to the sensor plate.

10. The flywheel according to claim 2, wherein the first portion is formed by reducing the wall thickness of the sensor plate as compared to the adjacent portions of the sensor plate.

11. The flywheel according to claim 2, wherein the sensor plate formed to a ring shape, and the first portion is formed by one of a width reduced in a diameter direction of the sensor plate, a through hole extending through the sensor plate, and a reduced wall thickness of the sensor plate.

12. The flywheel according to claim 1, wherein the sensor plate is attached to the flywheel cover by welded portions, the welded portions forming the coupling portions of the flywheel, respectively, the welded portions being arranged circumferentially adjacent to the first portion in the circumferential directions of the flywheel cover, respectively.

13. The flywheel according to claim 1, wherein the flywheel cover includes a front cover having the at least one recessed portion, and a rear cover coupled to the front cover with a damper member interposed between the front and rear covers.

14. The flywheel according to claim 13, wherein the damper member includes at least one coil spring with the at least one recessed portion of the front cover having a bottom projecting into a coil spring accommodating portion of the front cover that has the at least one coil spring.

* * * * *